United States Patent
Hicks, Jr.

(10) Patent No.: US 10,605,589 B2
(45) Date of Patent: *Mar. 31, 2020

(54) LASER MEASURING SYSTEM FOR TUBULARS

(71) Applicant: Bobby Frank Hicks, Jr., Garland, TX (US)

(72) Inventor: Bobby Frank Hicks, Jr., Garland, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/054,624

(22) PCT Filed: May 31, 2017

(86) PCT No.: PCT/US2017/035124
§ 371 (c)(1),
(2) Date: Aug. 3, 2018

(87) PCT Pub. No.: WO2018/222179
PCT Pub. Date: Dec. 6, 2018

(65) Prior Publication Data
US 2019/0257643 A1    Aug. 22, 2019

Related U.S. Application Data

(63) Continuation-in-part of application No. 15/233,815, filed on Aug. 10, 2016, now Pat. No. 9,534,886.

(51) Int. Cl.
*G01B 11/04* (2006.01)
*E21B 49/00* (2006.01)
(Continued)

(52) U.S. Cl.
CPC ............ *G01B 11/043* (2013.01); *E21B 45/00* (2013.01); *E21B 47/04* (2013.01); *E21B 49/001* (2013.01);
(Continued)

(58) Field of Classification Search
CPC .... G01B 11/043; G01B 17/00; G01B 11/026; G01N 2291/044; G01N 21/954; E21B 47/04; E21B 49/00
See application file for complete search history.

(56) References Cited

U.S. PATENT DOCUMENTS 6,536,272 B1 *   3/2003   Houston .................. G01N 1/12
                                                             702/2
9,074,871 B1 *   7/2015   Lubeck ................ G01B 11/026
(Continued)

*Primary Examiner* — Mirza F Alam
(74) *Attorney, Agent, or Firm* — Nolte Intellectual Property Law Group

(57) ABSTRACT

A laser measuring system for continuous measurement of a plurality of connected tubulars being inserted into or removed from a wellbore. The laser measuring system can have a laser housing with one or more laser surface velocimeters. The laser housing with a laser arm can be connected to a support member and can communicate via a network to a computer processor and data storage for measuring pipe joint length in real time. A pressurized gas port can pressurize the laser housing above ambient pressure to keep a laser beam clear of particulate and well fluids or ambient pressure can be used with a continuous airflow device. The laser beam is used to detect and calculate length and quantity of tubulars moving past the laser beam transmitting the information to the computer processor in real time.

15 Claims, 16 Drawing Sheets

(51) Int. Cl.
*G01P 3/36* (2006.01)
*G02B 23/24* (2006.01)
*E21B 47/04* (2012.01)
*E21B 45/00* (2006.01)

(52) U.S. Cl.
CPC ............... *G01P 3/36* (2013.01); *G02B 23/24* (2013.01); *G02B 23/2407* (2013.01)

(56) References Cited

U.S. PATENT DOCUMENTS

| | | | |
|---|---|---|---|
| 9,170,089 B2* | 10/2015 | Logan | G01B 11/00 |
| 2012/0257042 A1* | 10/2012 | McKaigue | G01N 21/954 |
| | | | 348/84 |
| 2016/0320769 A1* | 11/2016 | Deffenbaugh | E21B 47/06 |

\* cited by examiner

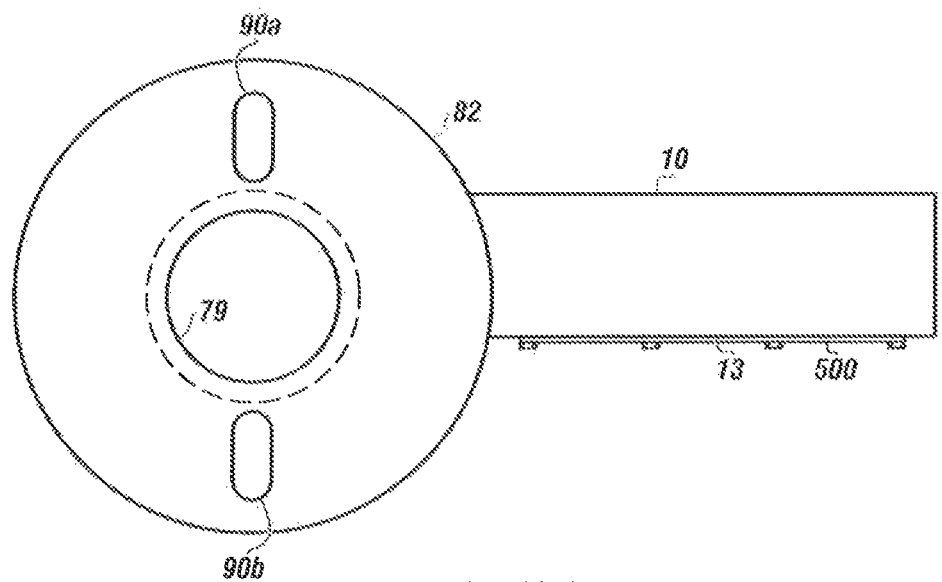
FIGURE 2B
FIGURE 2C
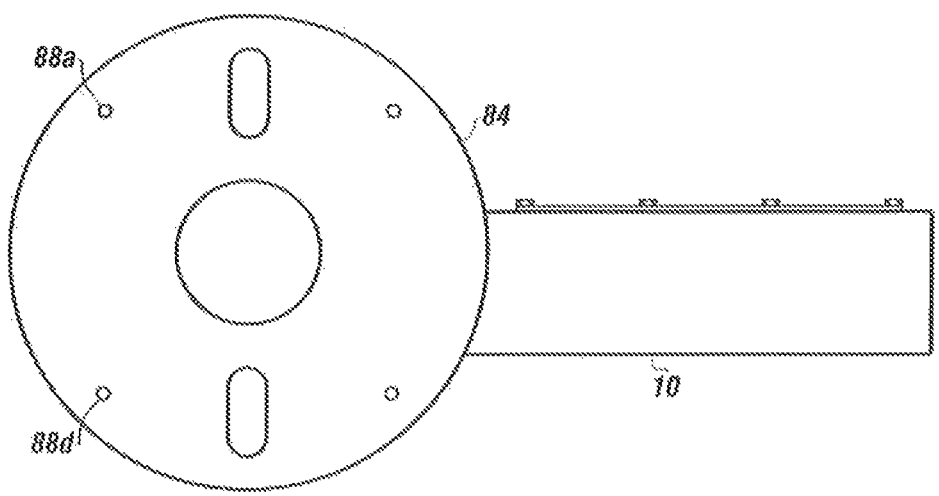

*FIGURE 4B*

| DATA STORAGE | 30 |

COMPUTER INSTRUCTIONS FOR THE PROCESSOR TO USE A NON-LINEAR FUNCTION TO REMOVE THE ROTATION MEASUREMENTS FROM THE VELOCITY MEASUREMENTS FOR EACH ROTATING TUBULAR ENABLING ISOLATION OF ROTATION OR VELOCITY MEASUREMENTS BY ROTATING TUBULAR TO PROVIDE A TOTAL LENGTH OF EACH TUBULAR, TOTAL DEPTH OF ALL CONNECTED TUBULARS — 612

COMPUTER INSTRUCTIONS FOR THE PROCESSOR TO USE A NON-LINEAR FUNCTION TO REMOVE THE ROTATION MEASUREMENTS FROM THE VELOCITY MEASUREMENTS FOR EACH ROTATING TUBULAR ENABLING ISOLATION OF ROTATION OR VELOCITY MEASUREMENTS BY ROTATING TUBULAR TO PROVIDE A TOTAL LENGTH OF EACH TUBULAR, TOTAL DEPTH OF ALL CONNECTED TUBULARS — 613

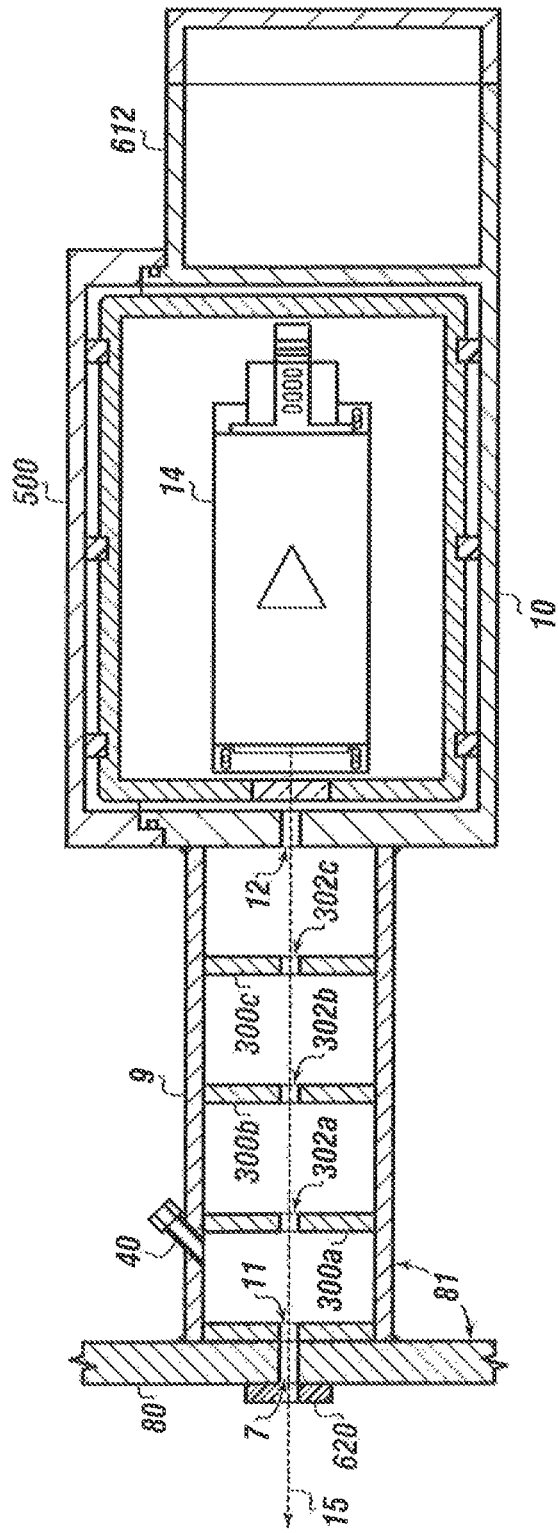

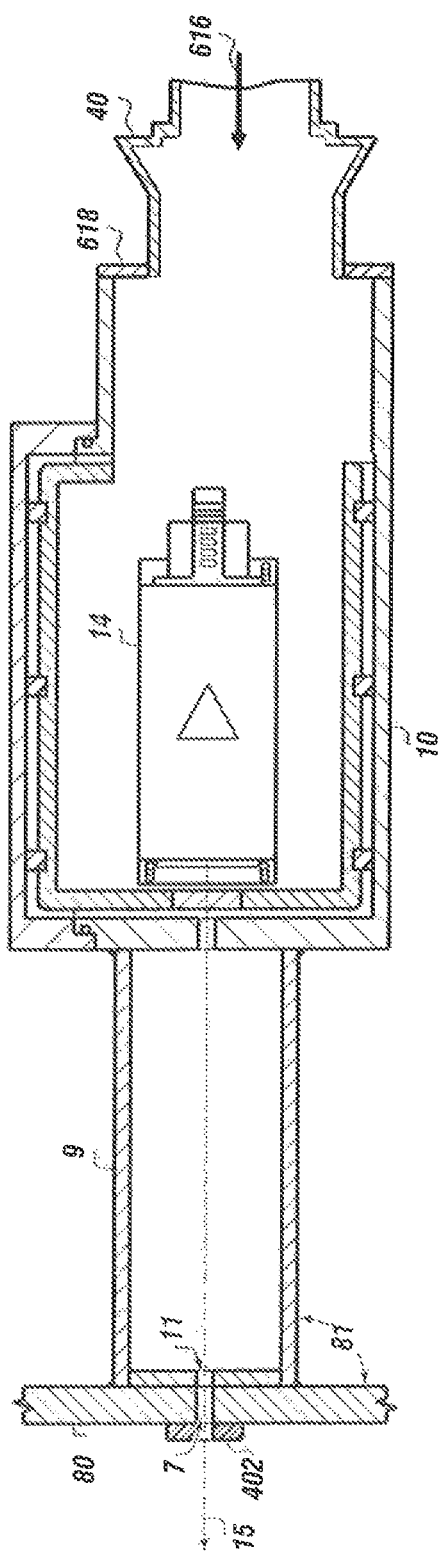

FIG. 7A
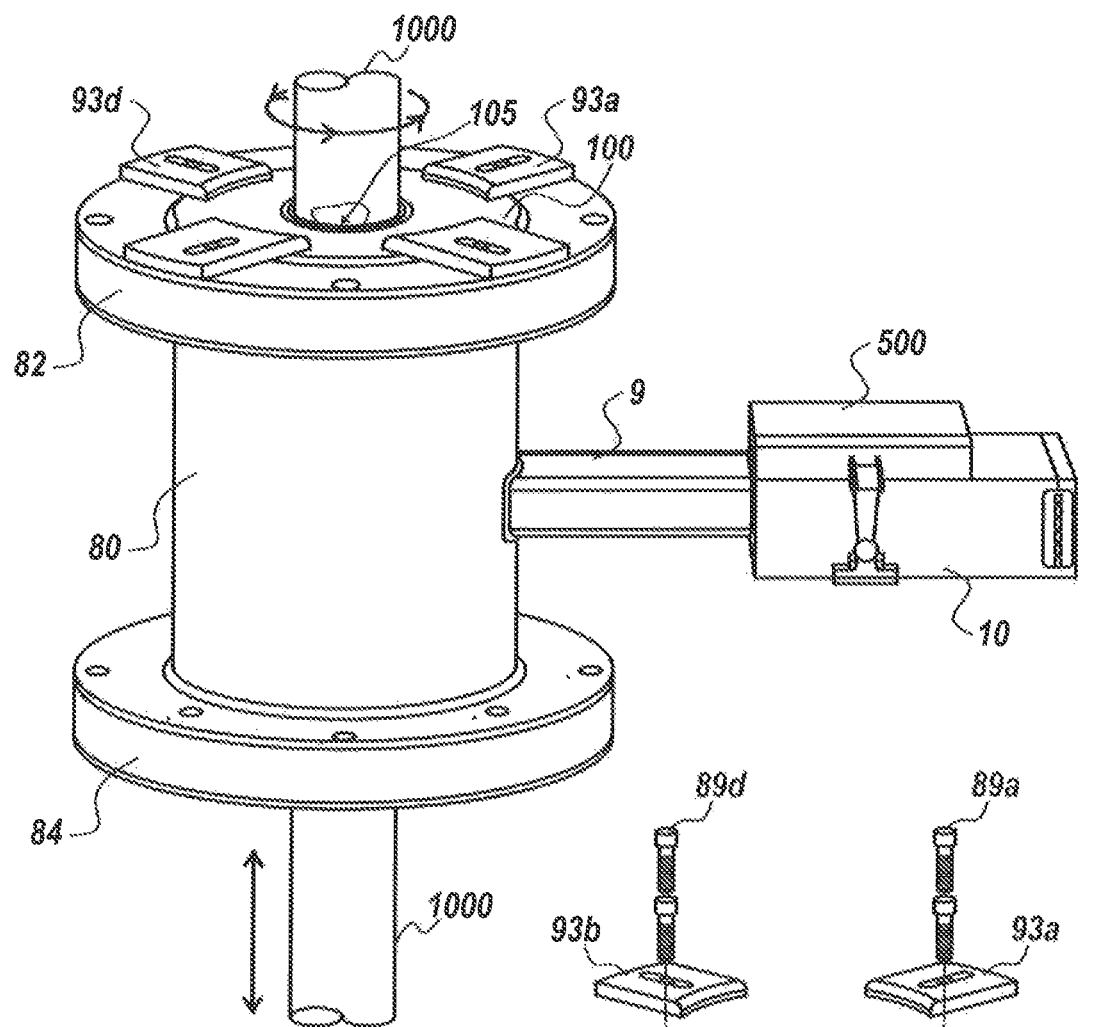
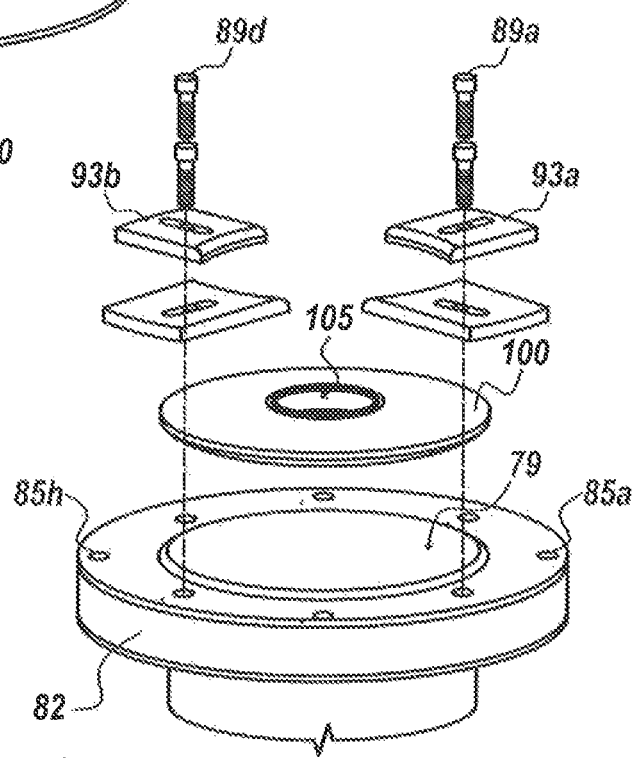
FIG. 7B

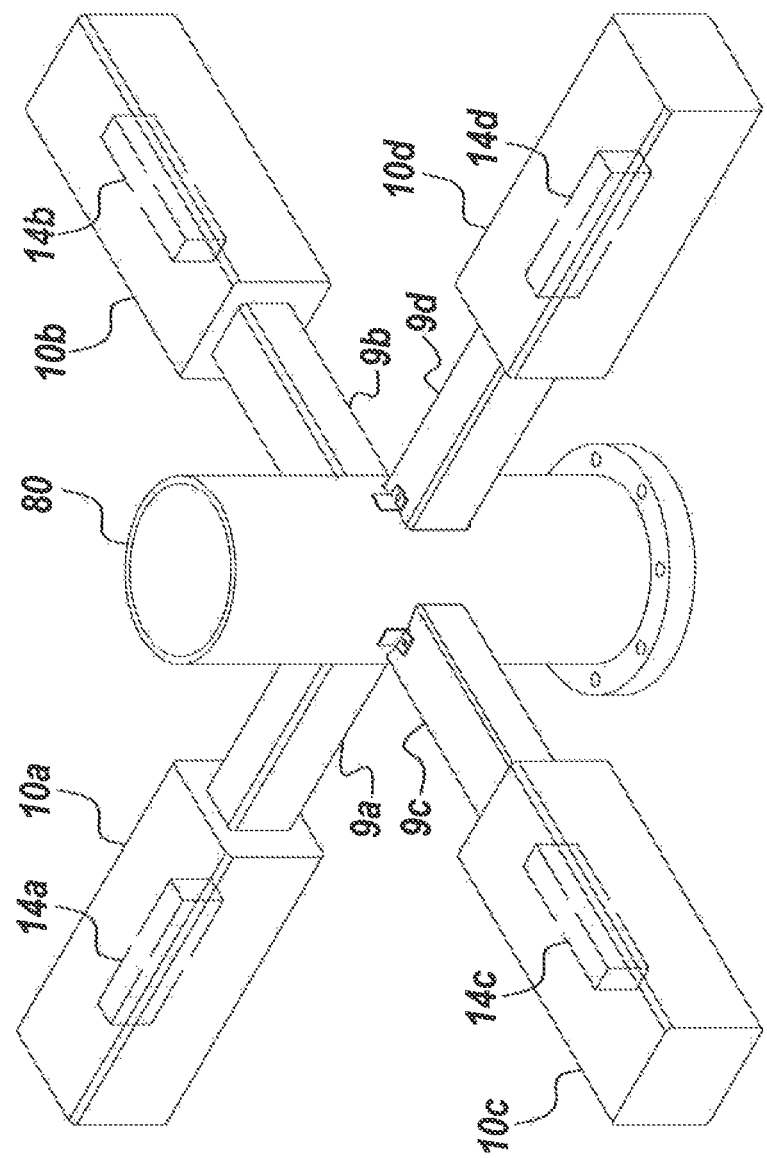

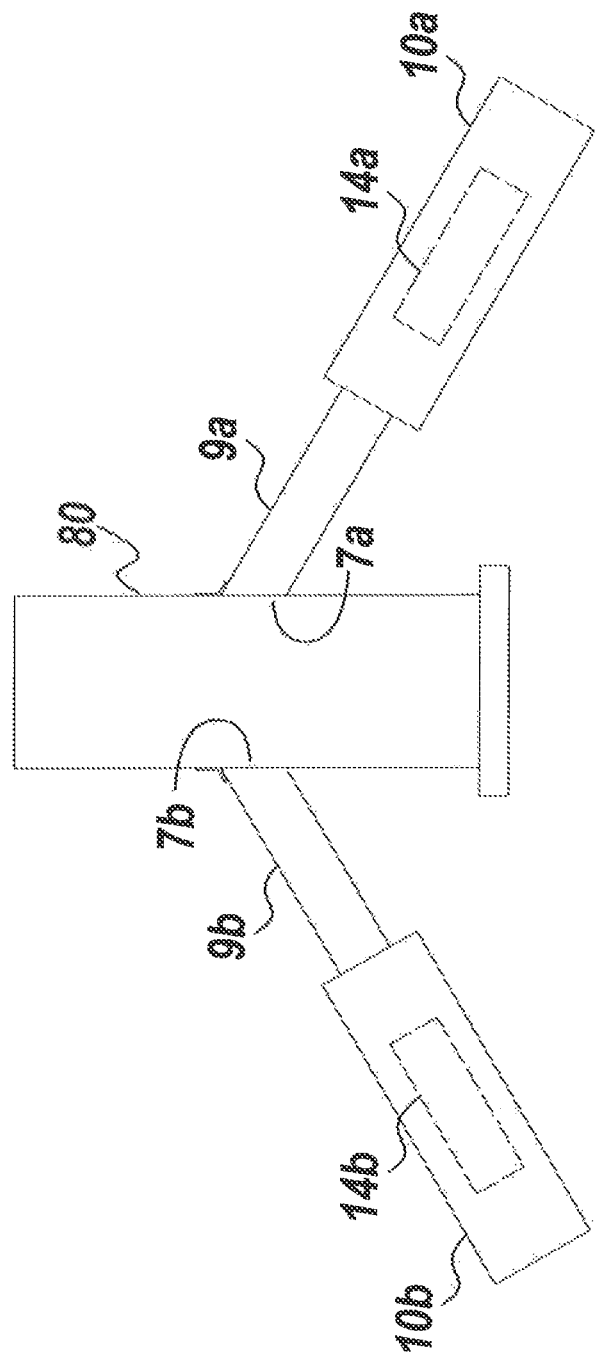

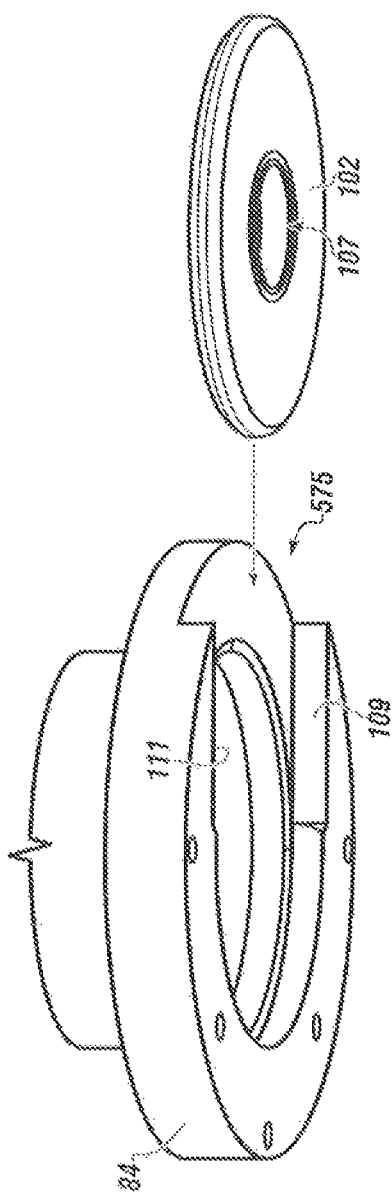

LASER MEASURING SYSTEM FOR TUBULARS

CROSS REFERENCE TO RELATED APPLICATION

The current application claims priority to and the benefit of PCT Application No. PCT/US2017/035124, filed on May 31, 2017, entitled "ADJUSTABLE LASER MEASURING SYSTEM FOR JOINTS OF PIPES" and U.S. patent application Ser. No. 15/233,815 filed Aug. 10, 2016 now U.S. Pat. No. 9,534,886 issued on Jan. 3, 2017, entitled "LASER MEASURING SYSTEM FOR JOINTS OF PIPES". These references are incorporated in its entirety herein.

FIELD

The present embodiments relate to a laser measuring system for continuous measurement of tubulars being removed from or inserted into a wellbore.

BACKGROUND

A need exists for an automated, remote controlled laser measuring system for use with tubulars in real time as the tubulars are pulled from a wellbore or inserted into a wellbore.

A further need exists for an accurate controllable laser measuring system with a housing supported off the ground and surrounding the tubulars being removed from or inserted into a wellbore.

The present embodiments meet these needs.

BRIEF DESCRIPTION OF THE DRAWINGS

The detailed description will be better understood in conjunction with the accompanying drawings as follows:

FIGS. 2A-2D depict views of a laser measuring assembly according to one or more embodiments.

FIGS. 4A and 4B depict a data storage according to one or more embodiments.

FIGS. 6A and 6B depicts a laser arm connected to a laser housing according to different embodiments.

FIGS. 7A and 7B depict an upper pipe wiper and upper mounting member according to one or more embodiments with a rotating tubular extending from the support.

FIGS. 8A to 8C depict various configurations of a plurality of surface laser velocimeters for rotating tubulars.

FIG. 9 depicts a lower rubber plate according to one or more embodiments.

Figure 1:
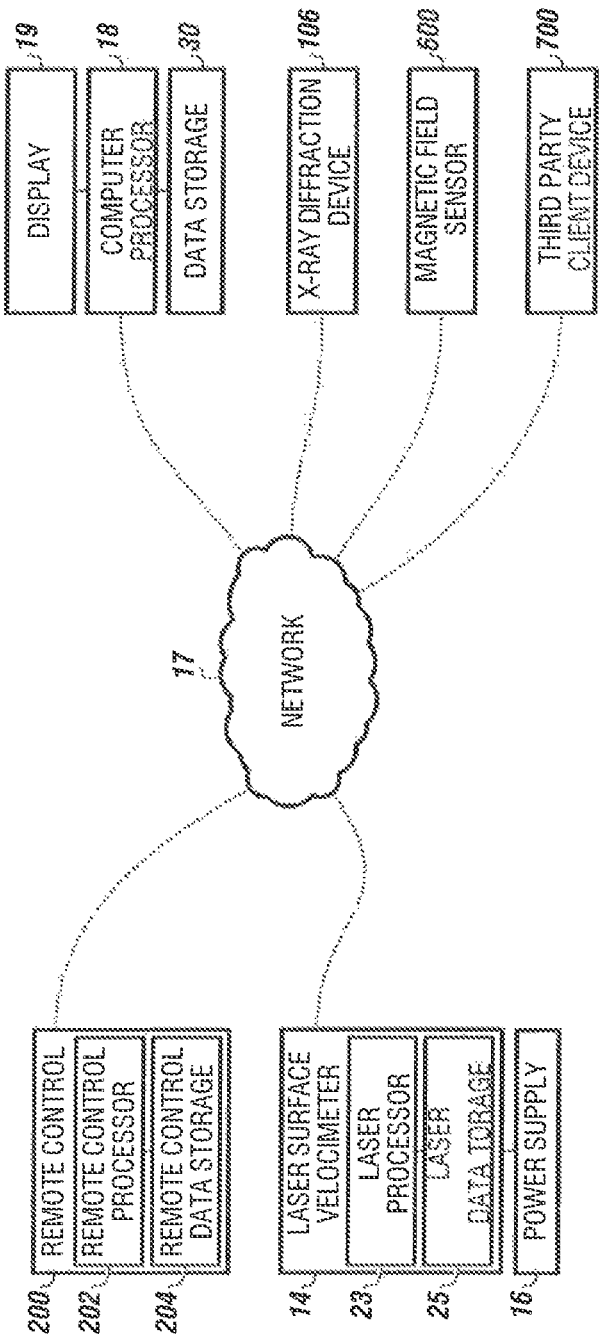
FIG. 1 is an overview of the laser measuring system according to one or more embodiments.
Figure 2A:
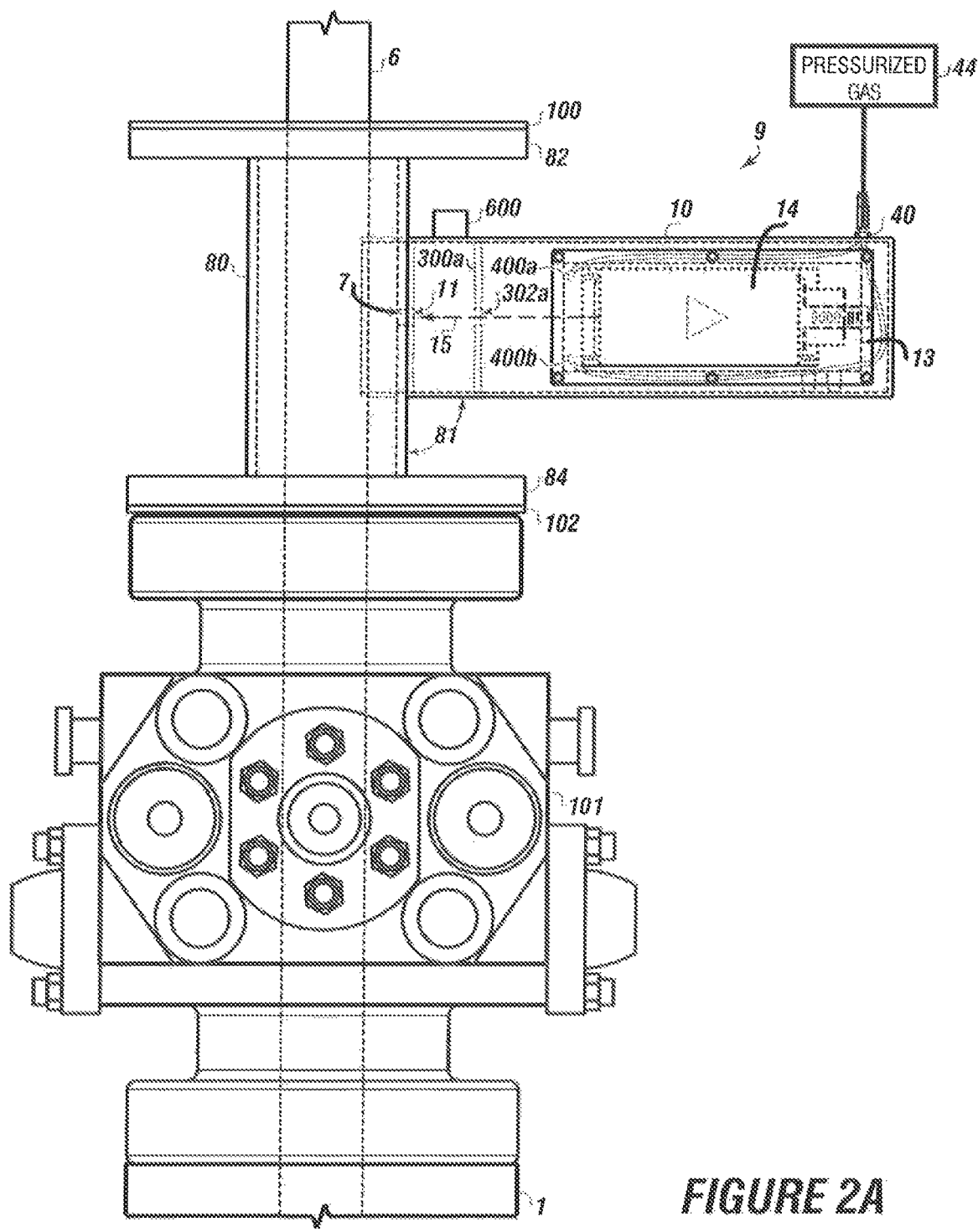
Figure 2D:
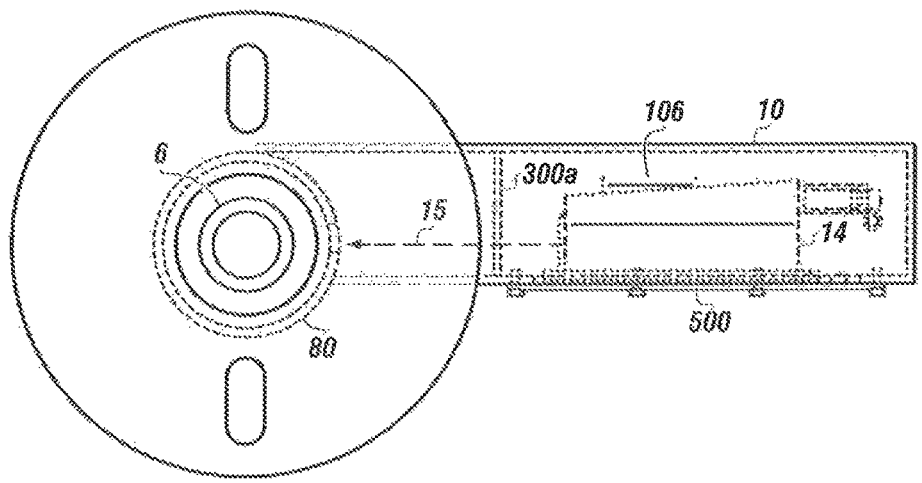

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The embodiments generally relate to a laser measuring system for tubulars.

The laser measuring system can measure and calculate tubular length as the tubular are inserted into a wellbore, such as in a hostile environment with heat, corrosives, mud, water, poor weather conditions, arctic conditions, and acidic conditions.

The laser measuring system can measure and calculate tubular length as the tubular is pulled out of the wellbore, such as in a hostile environment with heat, corrosives, mud, water, poor weather conditions, arctic conditions, and acidic conditions.

The laser measuring system is capable of measuring and performing calculations of connected tubulars both into and out of a wellbore.

The laser measuring system can provide an environmental advantage to minimize toxic fumes emanating from a wellbore by containing the volatile organic compounds, which can include toxic gases, from releasing from a wellbore using a dual sealing system as connected tubulars are removed from the wellbore.

The embodiments further relate to a laser measuring system for continuous measurement of tubulars being removed from or inserted into a wellbore.

The laser measuring system can have a laser housing containing a laser surface velocimeter.

The laser housing can mount directly or via a laser arm to a support member with an upper mounting member and an upper pipe wiper on one end and a lower plate with a lower pipe wiper on an opposite end.

Tubular can travel through a center hole of the support housing aligned with the center hole of each of the upper and lower pipe wipers.

In embodiments, a laser surface velocimeter can project a laser beam at each joint of pipe to measure a length of pipe and calculate a total length of connected tubular being installed in or pulled out of a wellbore. In embodiments, the laser surface velocimeter can be disposed between the upper and lower pipe wipers.

The laser surface velocimeter can communicate via a network to a computer processor and a data storage for carefully calculating measured pipe joint length in real time and a quantity of pipe joints sunk into or pulled out of a wellbore.

In an embodiment, a blower can be used to blow non-pressurized air into the laser housing or laser arm. In other embodiments, a pressurized gas port can pressurize the laser housing and/or laser arm above ambient pressure to keep the laser beam clear of particulate and well fluids as tubular are pulled through the support member and upper and lower pipe wipers.

The laser beam can be used to detect and calculate length and quantity of tubular moving past the laser beam, wherein the data and/or information can be transmitted to a computer, processor and/or data storage.

The term "data storage" as used herein refers to a non-transitory computer readable medium, such as a hard disk drive, solid-state drive, flash drive, tape drive, and the like.

The term "gas port" as used herein can refer to an insert gas port, such as air, nitrogen, or another non-explosive non-toxic gas.

The term "laser surface velocimeter" refers to a laser surface velocimeter with an interference pattern to measure the velocity of the tubular being run into and out of the wellbore further using a frequency meter and a Doppler Effect to compare reflected light from the tubular to emitted light and a reference frequency and calculate velocity for the tubular and then calculate length of the tubular.

The term "non-transitory computer readable medium" excludes any transitory signals but includes any non-transitory data storage circuitry, e.g., buffers, cache, and queues, within transceivers of transitory signals.

The term "pipe wiper" as used herein can refer to a wiper that can be a rubber material, an elastomeric material, or similar flexible disc shaped material, which can be made from a flexible, durable, impact resistant material to clean the pipe of grease and debris. The pipe wiper can be made of a material that can swell in the presence of water, such as the rubber used on the exterior of swell packers used in the industry. The pipe wiper is used to provide a clear reading by the laser on the tubular.

The term "real time" as used herein can refer to an update of information at the same rate the information is received, such as 24 hours a day, 7 days a week.

The term "tubulars" or "at least one tubular" as used herein can refer to joints of pipe, casing, coiled tubing, and drill pipe, or any type of pipe known in the oil and natural gas industry. In embodiments, the joints of pipe can be at least one joint of pipe. In embodiments, the joints of pipe can be a plurality of connected joints of pipes.

In an embodiment, the laser measuring system for automatic continuous measurement of multiple rotating tubulars being inserted into or removed from a wellbore can be made from several components.

The first major component is a support member having a center hole aligned with the wellbore.

The center hole is configured to receive multiple tubulars connected in series.

The support member has a plurality of laser beam openings with each laser beam opening penetrating to the center hole.

The support member is connected between an upper mounting member and a lower mounting member.

The system includes a plurality of rigid debris deflection devices. One rigid debris deflection device covers one of the laser beam openings in the support member.

Each rigid debris deflection device ensures minimal particulate penetration to a laser surface velocimeter.

The system includes an upper pipe wiper with a upper wiper opening connected to the upper mounting member and a lower pipe wiper with a lower wiper opening connected to the lower mounting member for cleaning each rotating tubular between the upper mounting member and the lower mounting member.

The invention includes a plurality of laser arms, with each arm separately connected to the support member at an angle.

In embodiments, the angles are identical.

In other embodiments, the angles differ.

The system includes a plurality of laser housings, with each laser housing connected to and aligned with one of the laser arms.

The system includes a plurality of laser surface velocimeters.

Each laser surface velocimeter is connected to a power supply.

Each laser surface velocimeter is positioned in one of the laser housings and oriented to project a laser beam onto a rotating tubular being pulled or pushed through the central hole of the support member.

Each laser surface velocimeter is configured to: calculate lengths of each rotating tubular being run into and out of the wellbore calculating a length of each rotating tubular; count quantities of rotating tubulars being run into and out of the wellbore and calculating a total quantity of rotating tubulars per run; and calculate a total length of all the connected rotating tubulars being run into or out of the wellbore.

The system includes a computer processor in communication with each laser surface velocimeter and a data storage having a computer readable medium that is not evanescent, in communication with the computer processor.

The data storage provides instructions for the computer processor to: receive and store measurements from each laser surface velocimeter; calculate individual lengths of each rotating tubular as each rotating tubular is run into an out of the well; calculate total quantities of rotating tubular being run into and out of the wellbore and calculating a total quantity of rotating tubular per run; and calculate a total length of all rotating tubular being run into or out of the wellbore.

A display is used in the system and the display is in communication with the computer processor for presenting measured and computed values in real time to a viewer, another user, which can be another computer.

It should be noted that the upper pipe wiper and the lower pipe wipers simultaneously ensure each laser beam has a debris-free and fluid-free reading surface for each rotating tubular.

The system is configured to measure a plurality of rotating tubulars, using a plurality of laser surface velocimeters, with each tubular rotating in the center hole and in the wellbore during drilling.

Turning now to the Figures, FIG. 1 depicts the laser measuring system according to one or more embodiments.

The laser measuring system 8 can be used for continuous measurement and calculation of lengths of tubulars being removed from or inserted into a wellbore.

The laser measuring system 8 can be used to continuous measurement and calculation of lengths of connected tubular being removed from or inserted into a wellbore.

The laser measuring system can be used to count tubular as they are separately inserted into or pulled from a wellbore.

Optionally, the laser measuring system can be used for continuous measurement of a velocity at which the tubulars are being removed from or inserted into a wellbore.

The laser measuring system 8 can ensure a clean, debris-free and fluid-free surface for laser beam impact on each individual joint of pipe.

The laser measuring system 8 can include a laser surface velocimeter 14.

The laser surface velocimeter can be a non-contact optical speed sensor measuring velocity and length on moving surfaces. The laser surface velocimeter can use the laser Doppler principle to evaluate the laser light scattered back from a moving object, such as a joint of pipe.

In embodiments, the laser surface velocimeter 14 can have a laser processor 23, which can be connected to a laser data storage 25.

The laser surface velocimeter 14 can connect to a power supply 16, wherein the power supply can be mounted to a component of the laser measuring system.

In embodiments, the power supply can be any known type of power supply, such as a fuel cell, a battery, a battery pack, or a rechargeable energy storage device.

In embodiments, the power supply 16 can be in wired or wireless connection with the laser surface velocimeter 14.

The laser surface velocimeter 14 can measure, calculate and transmit calculations of lengths of tubular and lengths of connected tubular to a network 17.

The laser surface velocimeter 14 can measure calculate and transmit calculations as tubulars are rotating in the support structure of the system.

The laser surface velocimeter 14 can be remotely controlled by a remote control 200, which can be connected to the network 17.

The remote control 200 can be a computer or a client device, such as a cellular phone, a smart phone, a tablet computer, a computer, a laptop, or similar device known in the industry.

The remote control 200 can receive additional information from at least one-third party client device 700, wherein the at least one third party client device can be connected to the network 17.

The remote control 200 can have a remote control computer processor 202, which can be connected to a remote control data storage 204.

The network can be any known network in the industry, such as a satellite network, a global communication network, a cellular network, a local area network, a wide area network, a fiber optic network, or combinations thereof.

The laser measuring system 8 can have a computer processor 18, such as an administrative processor, which can be connected to a data storage 30, such as an administrative data storage both of which can communicate with the laser surface velocimeter 14 via the network 17.

The data storage 30 can contain various computer instructions and data which can instruct the computer processor or another processor to receive, calculate, and store the measured lengths of tubular, optional pipe velocities and present calculations representing total lengths of connected tubular lengths on a display 19. In embodiments, the display can be a digital display.

The computer processor can present the measured tubular lengths and calculate total length of connected tubular, which can be seen on the display 19 in real time or as continuously updated.

In embodiments, an x-ray diffraction device 106 can communicate with the laser surface velocimeter 14 via the network 17 and to the computer processor 18. In embodiments, the x-ray diffraction device can communication simultaneously with the surface velocimeter and the computer processor.

The x-ray diffraction device 106 can provide information on detected fractures, cracks and other flaws in each joint of pipe as the connected tubular are withdrawn from or inserted into the wellbore.

In embodiments, the remote control 200 can connect to the laser processor 23 for a user to remotely actuate the laser surface velocimeter 14 through the network 17 from a geographic location remote to the laser surface velocimeter 14.

In embodiments, the processors and data storages can be computers or cloud based processors and data storages.

In embodiments, the laser measuring system can include a magnetic field sensor 600.

The magnetic field sensor 600 can be secured or installed proximate to the laser surface velocimeter 14 to detect magnetic field build up as tubular are removed from or inserted into the wellbore.

The magnetic field sensor 600 can communicate with the computer processor 18 via the network 17.

The magnetic field sensor 600 can provide an alarm when magnetic fields exceed a preset limit. The magnetic field preset limits can be stored in the data storage 30.

In embodiments, the computer processor 18, the laser processor 23, the remote control 200, the magnetic field sensor 600, and combinations thereof can communicate to or be in communication with at least one-third party client device 700 or multiple third party client devices.

The at least one third party client device 700 can be connected to the network 17. In embodiments, the at least one third party client device 700 can allow multiple laser surface velocimeters to be monitored simultaneously from a remote location.

The third party client device 700 can receive information from the multiple laser processors, computer processors, and laser surface velocimeters simultaneously for management operations of multiple laser measuring assemblies simultaneously.

The third party device can be a computer, a cellular phone, a tablet computer or similar computing device with bidirectional communication to the network 17.

FIGS. 2A-2D depict a laser measuring assembly according to one or more embodiments.

In embodiments, the laser measuring assembly can have a laser housing 10. In embodiments, the laser housing 10 can be hollow with a hinged lid, or removable sidewall or removable end wall.

In embodiments, the laser housing 10 can in cross section be rectangular, square, or round in shape. An octagonal shape or other polygon can be used.

In embodiments, the size of the laser housing has to be adequate to contain a laser beam-producing device.

The laser housing 10 can have at least one protection wall 300a. The at least one protection wall 300a can have an aperture 302a aligned with a laser beam 15 emitted by the laser surface velocimeter 14.

The aperture 302a can be an opening, a slit, a perforation, a hole, a plurality of holes or a plurality of openings that can enable the laser beam 15 produced by the laser surface velocimeter 14 to project from the laser housing 10 onto at least one joint of pipe 6 being pulled from or inserted into a wellbore 1.

The laser housing 10 can have a sealable opening 13. The sealable opening 13 needs to be large enough to enable insertion of the laser surface velocimeter 14 or large enough to enable repair of the laser surface velocimeter 14, without removing the laser surface velocimeter from the laser housing.

The sealable opening 13 can be closed with a hinged door 500, which can be secured to the laser housing 10.

In embodiments, the hinged door 500 can be a lid with fasteners.

In embodiments, the hinged door 500 can secure the laser housing 10 over the sealable opening 13.

In embodiments, the laser housing 10 can contain the laser surface velocimeter 14 and can optionally contain an onboard power supply.

The laser surface velocimeter 14 can be oriented to project the laser beam 15 directly from the laser surface velocimeter 14, or optionally from the laser surface velocimeter 14 through the aperture 302a in the at least one protection wall 300a to impact connected tubular being inserted into or removed from the wellbore 1.

Optionally, the laser surface velocimeter 14 can be used to detect and calculate a velocity of each joint of pipe moving past the laser beam 15 in real time as well as to detect and calculate a length of each joint of pipe moving past the laser beam 15.

Optionally, a pressurized gas port 40 can be formed through the wall of the laser housing 10 for receiving a pressurized gas 44, which can be pressurized air from a rig or pressurized gas, such as inert gas, from a standalone pressurized gas cylinder, and provide an increased gas pressure into the laser housing 10 by 3 percent above ambient pressure.

In embodiments, the laser beam can be reflected with mirrors onto the surface of each joint of pipe, and the connection can be at any angle, other than a right angle, and as low as forty-five degrees.

A support member 80 can have a center hole 79. The center hole 79 can be positioned over the wellbore 1. In embodiments, the support member 80 can be from five inches to sixty-eight inches in height and all the numbers in between.

In embodiments, the center hole 79 can range in diameter from one inch to sixteen inches.

The support member 80 can be connected between an upper mounting member 82 and a lower mounting member 84. In embodiments, the support member can be a hollow cylinder.

The upper mounting member 82 and the lower mounting member 84 can have diameters ranging from five inches to thirty-six inches.

The upper mounting member 82 and the lower mounting member 84 can each have a thickness from one-fourth of an inch to five inches.

The upper mounting member 82 and the lower mounting member 84 can each have a central hole for receiving and passing tubular. The diameters of these central holes can range from two inches to eighteen inches.

In embodiments, the upper mounting member and the lower plate can be round or circular, but can also have other shapes.

In embodiments, the upper mounting member and the lower plate can have identical outer diameters. In embodiments, the upper mounting member and the lower plate can have different sized outer diameters.

The support member 80 can have a wall thickness needed to hold from 10,000 pounds to 150,000 pounds of weight and all the numbers in between.

In embodiment, optionally, a plurality of upper fastener holes 90a-90b can be used to secure the upper mounting member 82 to additional oil field equipment.

If upper fastener holes are used, the diameters of the upper fastener holes can range from one-fourth of an inch to two inches.

In embodiments, from two upper fastener holes to twelve upper fastener holes can be used.

In embodiments, optionally, a plurality of lower fastener holes 88a-88d can be formed through the lower mounting member 84 for connecting the lower mounting member 84 to wellhead equipment or providing a freestanding alignment with the wellbore 1 above the wellhead equipment.

In embodiments, the lower plate can connect to a blowout preventer 101.

The plurality of lower fastener holes 88a-88d can have diameters that range from one-fourth of an inch to two inches.

In embodiments from two lower fastener holes to twelve lower fastener holes can be used. In embodiments, the fasteners can be bolts.

The support member 80 can have a first laser beam opening 7 formed in the support member 80 penetrating to the center hole 79.

In embodiments, a laser arm 9 can have a second laser beam opening 11, which can be aligned with the first laser beam opening 7. The laser arm 9 can be connected to and aligned with the laser housing 10.

In embodiments, the laser arm 9 can be connected to the support member 80 at an angle 81.

In embodiments, the at least one protection wall 300a can be mounted within the laser arm having the aperture 302a enabling the laser beam 15 to penetrate through the aperture 302a to at least one joint of pipe 6 being withdrawn from or inserted into the wellbore 1.

The angle 81 can be a ninety-degree angle or an angle from 80 degrees to 120 degrees, as long as the laser beam can impact each joint of pipe at approximately a right angle.

In embodiments, the angle 81 can be a right angle or an angle other than a right angle, so long as the angle used enables the laser beam 15 to impinge the at least one joint of pipe 6 passing through the center hole 79 of the support member 80.

An upper pipe wiper 100 can be mounted on the upper mounting member 82 and a lower pipe wiper 102 can be mounted on the lower mounting member 84.

With the dual rubber pipe wiper configuration, the laser measuring system can create a dual cleaning system between the upper mounting member and the lower plate to ensure the laser beam 15 is given a debris-free and fluid-free reading surface on each joint of pipe.

The pipe wipers, can be rubber, and ensure equipment to which the upper mounting member and the lower mounting member, which can be a lower plate, are attached stay free of debris and well fluids.

At least one nozzle 400a and 400b can be used for blowing on the pressurized gas port 40 and penetrating the laser housing 10. The at least one nozzle 400a and 400b can project pressurized gas, such as air, in a different direction simultaneously. The at least one nozzle 400a and 400b can cause movement of particulate in the laser housing 10 and cleaning of particulate away from the laser surface velocimeter 14.

The laser measuring assembly can have the magnetic field sensor 600, which can be used to detect and transmit magnetic field measurements as the at least one joint of pipe 6 passes the laser housing 10 and can optionally provide an alarm to a third party client device connected to the magnetic field sensor via the network when magnetic fields exceed a preset limit.

In embodiments, the laser measuring assembly can have the x-ray diffraction device 106 mounted to and in tandem with the laser surface velocimeter 14. The x-ray diffraction device can be used for projecting an x-ray beam in tandem and simultaneous with the laser beam at the at least one joint of pipe being pulled from or inserted into the wellbore 1. The x-ray diffraction device can detect fractures in the tubular in real time.

Figure 3:
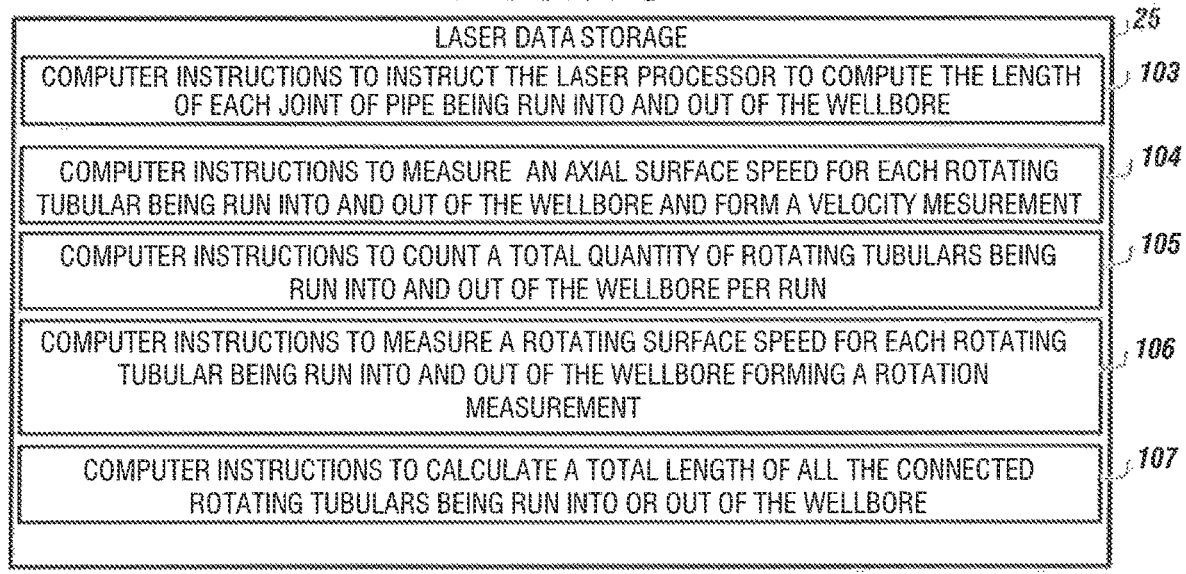
FIG. 3 depicts a laser data storage according to one or more embodiments.

FIG. 3 depicts a laser data storage according to one or more embodiments.

The laser data storage 25 can include computer instructions 103 to instruct the laser processor to compute the length of each joint of pipe being run into and out of the wellbore.

Each laser data storage can contain computer instructions to measure an axial surface speed for each rotating tubular being run into and out of the wellbore and form a velocity measurement 104.

Each laser data storage contains computer instructions to count a total quantity of rotating tubulars being run into and out of the wellbore per run 105.

Each laser data storage contains computer instructions to measure a rotating surface speed for each rotating tubular being run into and out of the wellbore forming a rotation measurement 106.

Each laser data storage contains computer instructions to calculate a total length of all the connected rotating tubulars being run into or out of the wellbore 107;

In embodiments, the laser data storage can include computer instructions to instruct the laser processor to actuate the laser beam and use reflected laser beam frequencies to calculate a velocity and a length of each joint of pipe being run into and out of the wellbore.

Figure 4A:
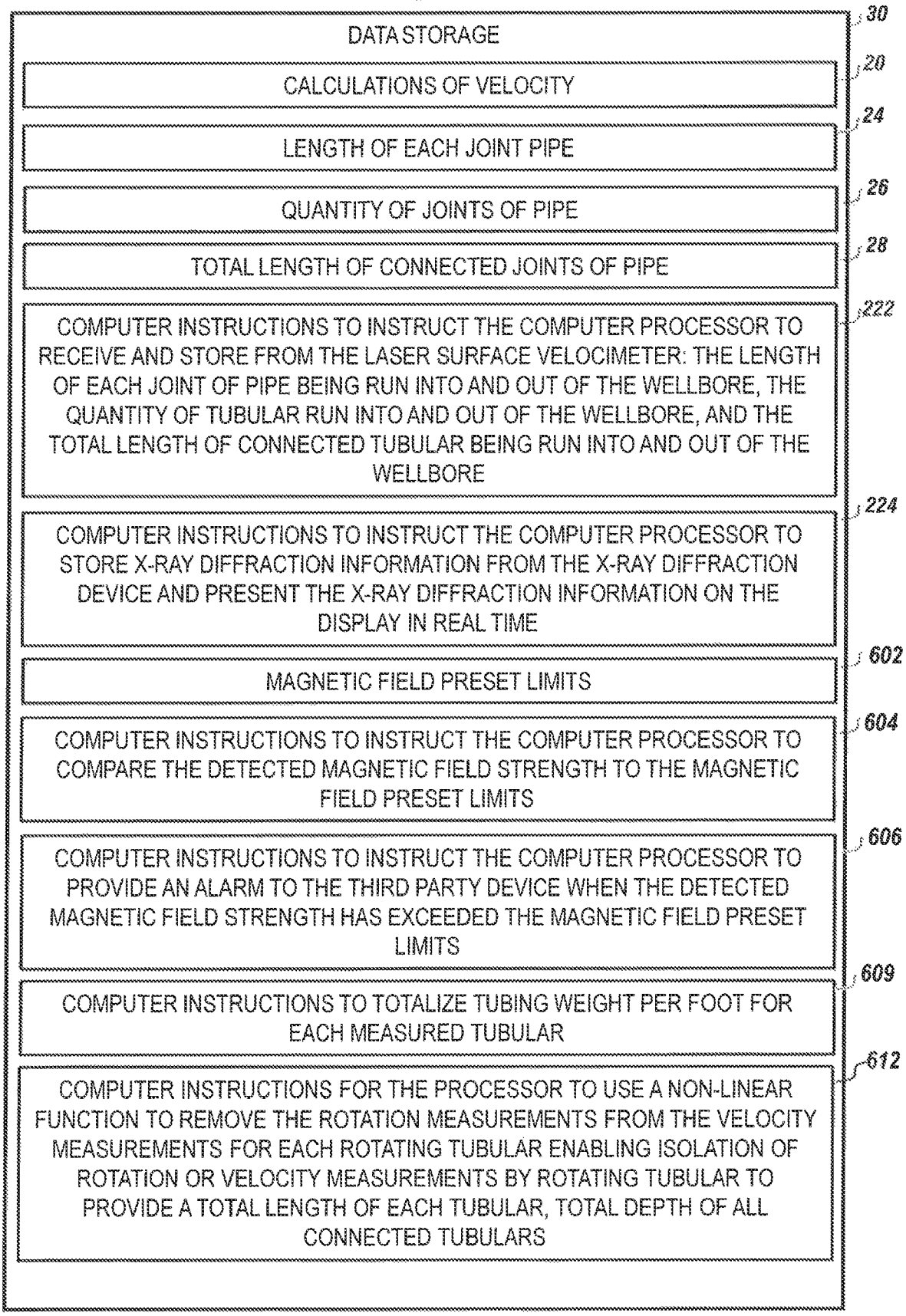

FIGS. 4A and 4B depict a data storage according to one or more embodiments.

The data storage 30 can contain calculations of velocity 20, lengths of each joint of pipe 24 being run into and out of the wellbore, quantities of tubular 26 run into and out of a wellbore, and total lengths of connected tubular 28.

The data storage 30 can contain computer instructions 222 to instruct the computer processor to receive and store from the laser surface velocimeter: the length of each joint of pipe being run into and out of the wellbore, the quantity of tubular run into and out of the wellbore, and the total length of connected tubular being run into and out of the wellbore.

The data storage 30 can contain computer instructions 224 to instruct the computer processor to store x-ray diffraction information from the x-ray diffraction device and present the x-ray diffraction information on the display in real time.

The data storage 30 can contain magnetic field preset limits 602 used for producing an alarm when detected magnetic fields at the housing exceed the preset limits. In embodiments, the present limits can be preset limits known in the industry or preset limits set by the user of the system for a particular job.

The data storage 30 can have computer instructions 604 to instruct the computer processor to compare the detected magnetic field strength to the magnetic field preset limits.

The data storage 30 can have computer instructions 606 to instruct the computer processor to provide an alarm to the third party device when the detected magnetic field strength has exceeded the magnetic field preset limits.

The data storage has and computer instructions 609 to totalize tubing weight per foot for each measured tubular.

The data storage has computer instructions 611 for the processor to calibrate each laser surface velocimeter and to receive and store measurements from each laser surface velocimeter; calculate lengths of each rotating tubular as each rotating tubular is run into an out of the wellbore; calculate total quantities of rotating tubulars being run into and out of the wellbore; and calculate a total length of all rotating tubular being run into or out of the wellbore.

The data storage has computer instructions 613 for the processor to use a non-linear function to remove the rotation measurements from the velocity measurements for each rotating tubular enabling isolation of rotation or velocity measurements by rotating tubular to provide a total length of each tubular, total depth of all connected tubulars.

Figure 5A:
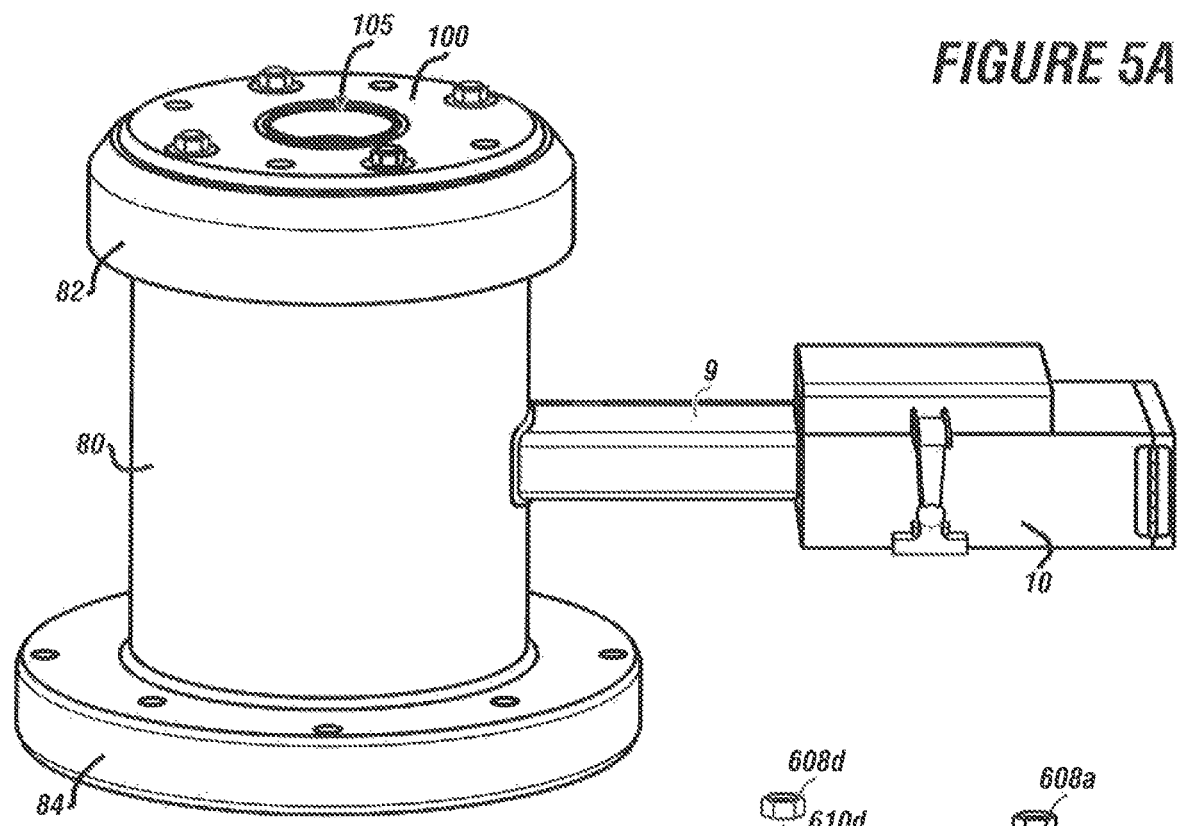
FIGS. 5A and 5B depict an upper mounting member according to one or more embodiments.
Figure 5B:
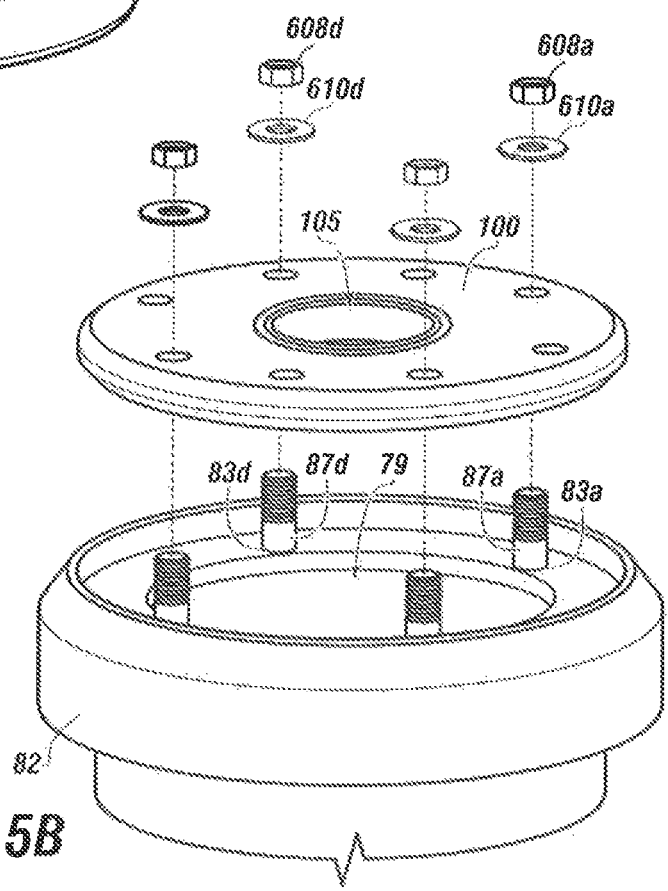

FIGS. 5A and 5B depict an upper mounting member according, to one or more embodiments.

The upper mounting member 82 can be secured to the upper pipe wiper 100. The upper pipe wiper can be connected to the support member with a plurality of bolts 87a-87d mounted through bolt holes 83a-83d surrounding the center hole 79 of the support member 80.

In embodiments, the upper pipe wiper 100 can have an upper wiper opening 105.

Bolts 608a-608d with washers 610a-610d can be used to hold the upper pipe wiper 100 onto the plurality of bolts 87a-87d mounted in the bolt holes 83a-83d of the upper mounting member 82. In embodiments, the bolts can be any type of fastener known in the industry.

In embodiments, the laser housing 10 can be mounted longitudinally to the laser arm 9, which can be mounted to the support member 80, such as at a right angle.

In embodiments, the support member 80 can be connected to the lower mounting member 84.

FIG. 6A depicts a laser arm connected to a laser housing according to one or more embodiments.

The laser housing 10 with the laser arm 9 can be directly secured to the support member 80.

A debris deflection device 620 can cover the first laser beam opening 7 in the support member 80 to prevent particulate, such as debris and well fluids, from penetrating the laser housing 10 with the hinged door 500. In embodiments, the debris deflection device 620 can enable the laser beam 15 to pass unimpeded by debris and well fluids.

In embodiments, the debris deflection device 620 can be made from rubber, plastic, metal or combinations thereof.

The laser arm 9 can have a second laser beam opening 11, which can be aligned with the first laser beam opening 7.

In embodiments, the laser measuring system can have a plurality of protection walls 300a-300c.

Each protection wall 300a-300c can be mounted within the laser arm 9, wherein each protection wall can have an aperture 302a-302c. Each aperture 302a-302c can be aligned with the first laser beam opening 7, the second laser beam opening 11, and a third laser beam opening.

Each protection wall 300a-300c can be configured to prevent debris from contacting a lens of the laser surface velocimeter 14.

In embodiments, from zero to ten protection walls can be used.

In embodiments, each protection wall can have zero or more apertures.

The laser arm 9 can be connected to the support member 80 at an angle from 81, such as an angle up to 90 degrees.

In embodiments, the pressurized gas port 40 can penetrate the laser arm 9 for providing a pressurized gas, such as air or nitrogen, into at least one of: the laser arm 9 and the laser housing 10, to increase gas pressure in the laser arm, the laser housing or both, by at least five percent above ambient pressure to ensure the laser beam openings are kept clear of debris generated by the wellbore or joint of pipe.

A cord housing 612 can be connected to the laser housing 10, which can be used for holding a power cord to engage the power supply to energize the laser measuring system.

FIG. 6B depicts a laser arm connected to a laser housing according to one or more embodiments.

The laser housing 10 with the laser arm 9 can be directly secured to the support member 80.

Figure 10:
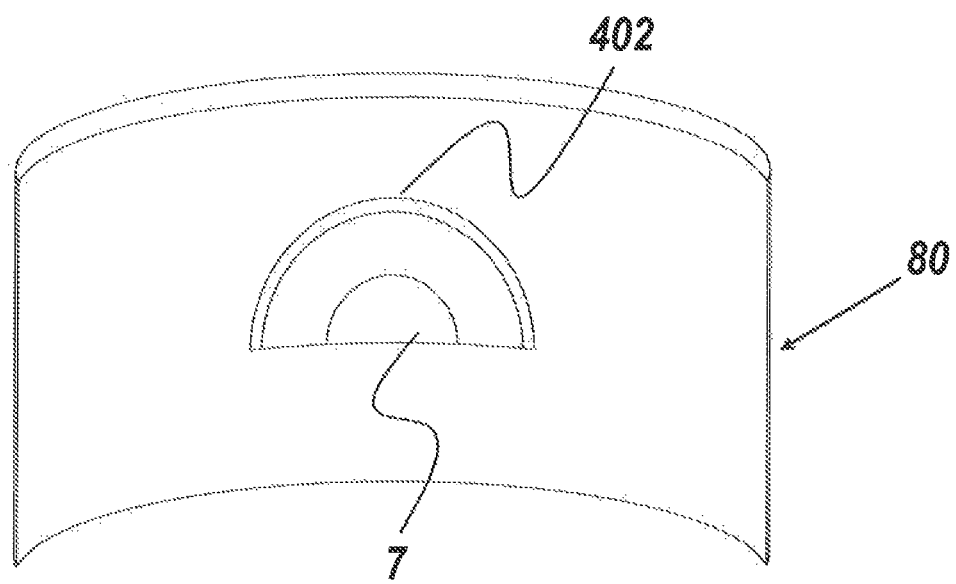
FIG. 10 depicts a debris deflection device that is inside the support member.

A debris deflection device 402 also shown in FIG. 10 can cover the first laser beam opening 7 in the support member 80 to prevent particulate, such as debris and well fluids, from penetrating the laser housing 10.

In embodiments, the debris deflection device 402 which can be made from steel and enables the laser beam 15 to pass unimpeded by debris and well fluids.

The laser beam can pass from the surface laser velocimeter to the tubular without being impeded by any protection walls in this embodiment.

The laser arm 9 can be connected to the support member 80 at an angle 81, such as an angle from 30 degrees to 150 degrees to the longitudinal axis of the tubular.

In embodiments, a pressurized gas port 40 can penetrate the laser arm 9 so that the laser is between the pressurized gas port 40 and the tubular.

The pressurized gas port provides a pressurized gas, such as air or nitrogen, into at least one of: the laser arm 9 and the laser housing 10, to increase gas pressure in the laser arm, the laser housing or both, by at least three percent above ambient pressure to ensure the laser beam is kept clear of debris generated by the wellbore or tubular.

In another embodiment, the laser housing can have an inlet 616 which is open allowing ambient air, delivered at ambient pressures, such as from a blower to enter the laser housing and blow particulate and well fluids from the laser lens to ensure the laser lens stays cool and stays clean.

The laser arm 9 is shown having a laser beam opening 11.

The laser surface velocimeter 14 can be centrally mounted in the laser housing.

In an embodiment, the laser housing 10 has an inlet plate 618 mounted around the inlet 616 providing a secure connection over the inlet 616 to the laser housing 10 from an ambient pressure air flow source or pressurized air source to simultaneously cool the laser surface velocimeter and prevent debris from impacting the laser surface velocimeter maintaining a clean laser lens.

FIGS. 7A and 7B depict an upper pipe wiper and upper mounting member according to one or more embodiments surrounding a rotating tubular 1000 which is rotating.

In embodiments, a plurality of clamps 93a-93d can be used to hold down the upper pipe wiper 100 to the upper mounting member 82.

A plurality of clamp holes 85a-85h can be formed in the upper mounting member 82.

In embodiments, a plurality of fasteners 89a-89d, such as screws, can be installed into each clamp hole 85a-85h to retain one of the clamps 93a-93d.

The plurality of fasteners 89a-89d and plurality of clamps 93a-93d can secure the upper pipe wiper 100 with the upper wiper opening 105 to the upper mounting member 82. The upper mounting member 82 can be affixed to the support member 80, which can have the center hole 79 aligned with the wellbore.

In embodiments, the support member 80 can be connected to the lower mounting member 84.

The upper pipe wiper 100 can be configured to clean an outer surface of each joint of pipe as each joint of pipe is run into or out of the wellbore by pulling against the joint of pipe as the joint of pipe passes through the upper pipe wiper 100.

The upper pipe wiper 100 can have a thickness from one-fourth inch to four inches and a diameter from six inches to fifteen inches.

In embodiments, the laser housing 10 can engage the laser arm 9 and the hinged door 500.

In embodiments, the laser measuring system is configured to calculate rotating tubular length using a measured velocity of each tubular as each rotating tubular is pulled or inserted into a wellbore and while each tubular is additionally rotated in the center hole and in the wellbore during drilling.

FIG. 8A shows a multilaser configuration of the system as attached to a single support member 80.

FIG. 8A depicts a laser measuring system embodiment using a pair of first mounted laser surface velocimeters 14a and 14b secured to the support member 80 and a pair of second mounted laser surface velocimeter 14c and 14d secured to the same support member 80 at same 90 degree angles but at different rotational angles.

Four laser arms 9a, 9b, 9c, and 9d are directly connected to the support member 80. Two laser arms have same angles of inclination. Two laser arms can have different angles of inclination.

A plurality of laser housings 10a, 10b, 10c, and 10d are used, each laser housing is connected to and aligned with one of the laser arms. Each laser housing can be angled so that the laser beam from the laser surface velocimeter can impinge the rotating tubular.

In FIG. 8A, each laser housing can be detachable and removable from one of the laser arms.

In FIG. 8A, each laser arm can be detachable and removable from the support member 80.

In FIG. 8A, the combination of laser arm and laser housing can be detachable and removable from the support member 80.

The laser surface velocimeters 14c and 14d are each mounted within a laser housing in such a manner as to provide a laser beam that impinges the rotating tubular at an angle from 0.01 degrees to 180 degrees from the other pair of laser surface velocimeters 14a and 14b.

FIG. 8B depicts a laser measuring system embodiment with two laser surface velocimeters 14a and 14b.

In FIG. 8B, two laser arms 9a and 9b are directly connected to the support member 80 at two different angles of inclination.

Laser beam openings 7a and 7b are shown, one opening per laser arm.

A plurality of laser housings 10a and 10b are used. Each laser housing is connected to and aligned with one of the laser arms.

The laser housings can each be angled so long as the laser beams from each laser surface velocimeter can impinge the rotating tubular in the center hole of support member 80.

Each laser surface velocimeter 14a and 14b transmits a laser beam to impinge the rotating tubular at an angle from 0.01 degrees to 180 degrees. The first laser surface velocimeter 14a and be mounted at a different angle from the second laser surface velocimeter 14b on the support member 80.

Figure 8C:
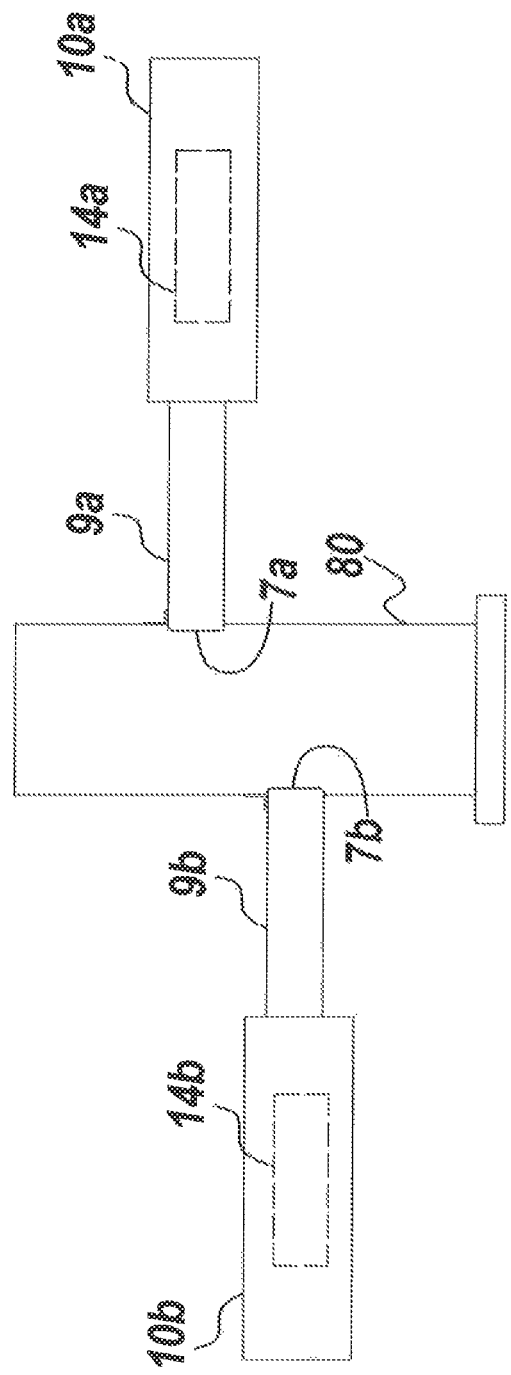

FIG. 8C depicts a laser measuring system with two laser arms 9a and 9b directly connected to the support member 80. The two laser arms are offset from each other on opposite sides of the support member 80.

A plurality of laser housings 10a and 10b are used. Each laser housing is connected to and aligned with one of the laser arms.

A first and second mounted laser surface velocimeter 14a and 14b are used.

Each laser surface velocimeter 14a and 14b is inserted in a laser housing. Each laser surface velocimeter is mounted so the laser beam impinges the rotating tubular as the rotating tubular is being pulled or pushed through the center hole of the support member.

The laser beam openings 7a and 7b are shown.

FIG. 9 depicts a lower rubber plate according to one or more embodiments.

The lower pipe wiper 102 can have a lower wiper opening 107, which can be connected to the lower mounting member 84.

In embodiments, the lower mounting member 84 can have a holder 575 for receiving and containing the lower pipe wiper 102 on at least one side 109 of the lower pipe wiper. In embodiments, the lower pipe wiper can have a second side 111.

The lower pipe wiper 102 can be slid into the holder 575 of the lower mounting member 84 for a faster install and replacement of the lower pipe wiper. The lower mounting member 84 can be affixed to the support member opposite the upper mounting member.

FIG. 10 shows a rigid debris deflection device 402 covering the first laser beam opening 7 projecting from an inner surface of the support member 80. The rigid debris deflection device ensures minimal particulate penetration to the laser surface velocimeter.

The rigid debris deflection device 402 can include a member of the group: a rubber, a steel, a plastic and a composite sufficiently stiff in durometer to prevent particulate from entering the laser housing.

Figure 11:
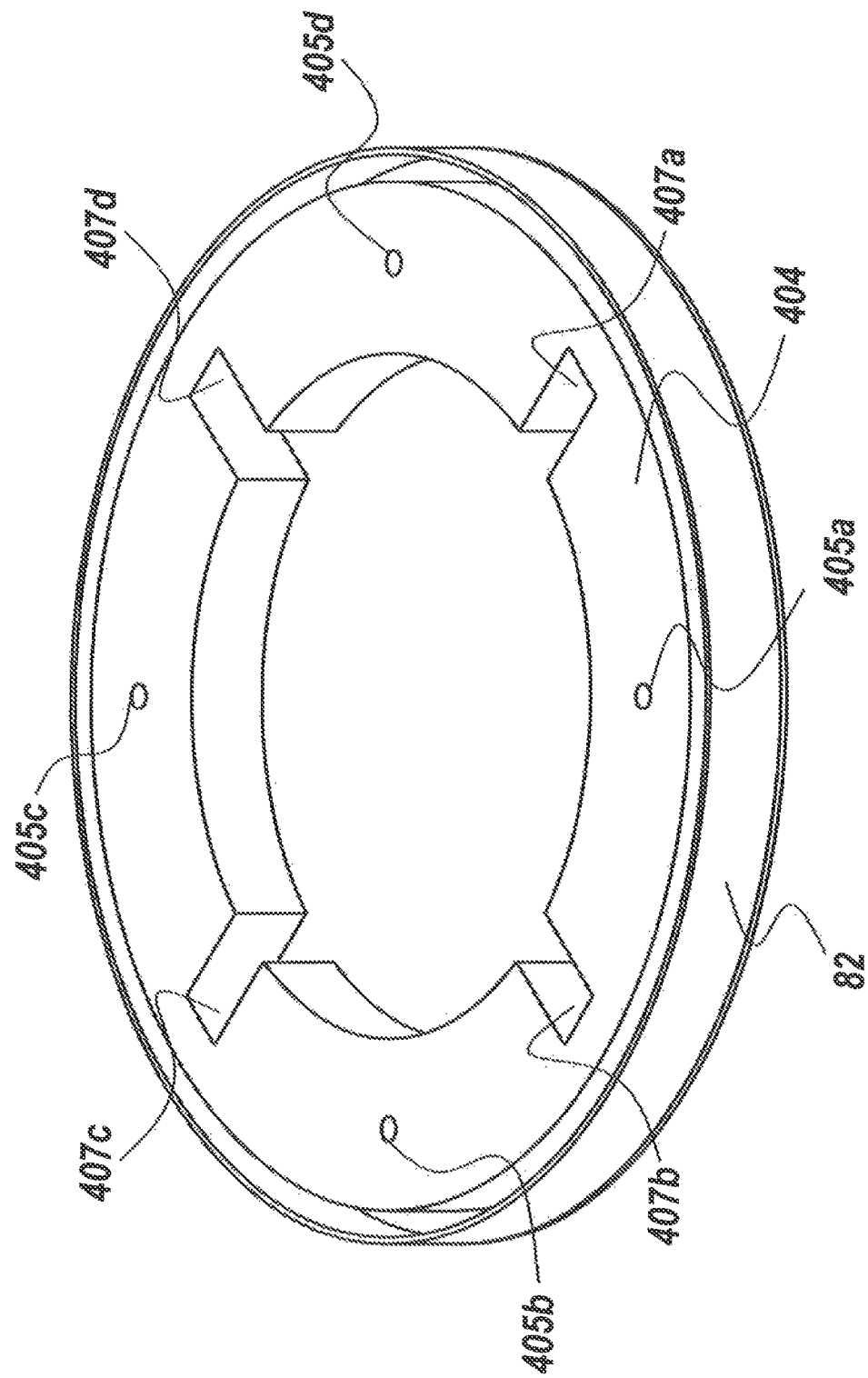
FIG. 11 depicts a wiper cover usable herein.

FIG. 11 depicts a wiper cover 404 partially covering and circumferentially surrounding the upper pipe wiper.

The wiper cover 404 has a plurality of mounting holes 405a, 405b, 405c, and 405d aligning with bolts 87a and 87b of the upper mounting member 82 shown in another Figure.

The wiper cover is configured to retain the upper pipe wiper in place as rotating tubular are pulled from the center hole.

In embodiments, a plurality of debris slots 407a, 407b, 407c and 407d are formed in the wiper cover 404 to flow debris away from the tubular as the tubular penetrates the center hole.

In embodiments, the plurality of laser surface velocimeters are a pair of first mounted laser surface velocimeters and a pair of second mounted laser surface velocimeters, wherein the second mounted laser surface velocimeter is mounted to impinge the laser beam on the tubular at an angle from 0.01 degrees to 180 degrees from the first mounted laser surface velocimeters.

In embodiments, the plurality of laser surface velocimeters are two laser surface velocimeters with the first mounted laser surface velocimeter mounted to the support is at a right angle to the longitudinal axis of a tubular, and the second mounted laser surface velocimeter is mounted on the support at an angle to transmit a beam to impact the tubular, wherein each laser surface velocimeter transmits a beam to impinge the tubular at an angle from 0.01 degrees to 180 degrees and the first laser surface velocimeter is mounted on the support 80 at a different angle from the second laser surface velocimeter.

In embodiments, the plurality of laser surface velocimeters are two laser surface velocimeters with the first mounted laser surface velocimeter attached to the support 80 at a right angle to the longitudinal axis of a tubular and opposite and aligned with the second mounted laser surface velocimeter and mounted to the support at a right angle to the longitudinal axis of the tubular.

In embodiments, the plurality of laser surface velocimeters are a first and second mounted laser surface velocimeter, each laser surface velocimeter mounted to the support at right angles to the longitudinal axis of a tubular being pulled or pushed through the center hole of the support, and wherein the first and second laser surface velocimeters are mounted to be offset from each other.

In embodiments, the laser measuring system has a wiper cover partially covering and circumferentially surrounding the upper pipe wiper, the wiper cover comprising a plurality of mounting holes aligning with bolts of the upper mounting member 82 the wiper cover configured to retain the upper pipe wiper in place as tubular are pulled from the center hole.

In embodiments, a plurality of debris slots formed in the wiper cover to flow debris away from the pipe joint as the pipe joint penetrates the center hole.

In embodiments, each laser housing, has an inlet over which is mounted an inlet plate providing input to the laser housing from either an ambient pressure air flow source such as a blower or a pressurized air from a pressurized air source to simultaneously cool one of the laser surface velocimeters and prevent debris from impacting the same laser surface velocimeter maintaining a clean laser lens. In embodiments, some of the laser housings can use pressurized air while other laser housings may have ambient air.

In embodiments, the system includes a remote control with a remote control processor and a remote control data storage, the remote control in communication with the laser surface velocimeter, the remote control data storage having computer instructions to instruct the remote control processor to remotely actuate the laser surface velocimeter via a network from a geographic location remote to the laser surface velocimeter and computer instructions to totalize tubing weight per foot for each measured tubular.

In embodiments, at least one third party client device for receiving information from the computer processor for remote management operations of multiple laser measuring systems simultaneously.

In embodiments, each laser surface velocimeter generates an interference pattern to measure the velocity of the tubular being run into and out of the wellbore further using a frequency meter and a Doppler Effect to compare reflected light from the tubular to emitted light and a reference frequency and calculate velocity for the tubular and then calculate length of the tubular.

In embodiments, the rigid debris deflection device can made from a material selected from the group: a rubber, a steel, a plastic and a composite sufficient stiff in durometer to prevent particular from entering the laser housing.

While these embodiments have been described with emphasis on the embodiments, it should be understood that within the scope of the appended claims, the embodiments might be practiced other than as specifically described herein.

What is claimed is:

1. A laser measuring system for automatic continuous measurement of multiple rotating tubulars being inserted into or removed from a wellbore, the laser measuring system comprising:
   a support member having a center hole, the center hole to be aligned with the wellbore and receive the multiple rotating tubulars connected in series, the support member having a plurality of laser beam openings, each laser beam opening penetrating to the center hole;
   a plurality of laser arms connected to the support member at an angle to a longitudinal axis of each rotating tubular;
   a plurality of laser housings connected to and aligned with one of the plurality of laser arms;
   a pressurized gas port penetrating at least one of: the laser arm and the laser housing, providing a pressurized gas into at least one of the laser arm and the laser housing, to increase gas pressure in the laser arm, the laser housing, or the laser arm and the laser housing;
   a plurality of laser surface velocimeters, each laser surface velocimeter oriented to project a laser beam onto each rotating tubular pulled or pushed through the center hole, the plurality of laser surface velocimeters being configured to measure an axial surface speed and a rotating surface speed for each rotating tubular;
   an upper mounting member;
   a lower mounting member;
   an upper pipe wiper with an upper wiper opening connected to the upper mounting member; and
   a lower pipe wiper with a lower wiper opening connected to the lower mounting member, the upper pipe wiper and the lower pipe wiper for cleaning each rotating tubular between the upper mounting member and the lower mounting member.

2. A laser management system, comprising:
a support member having a center hole, the center hole to be aligned with a wellbore to receive a plurality of rotating tubulars connected in series as the rotating tubulars are inserted into or removed from the well bore;
a plurality of laser surface velocimeters, each laser surface velocimeter mounted to a portion of the support member and positioned and oriented to project a laser beam onto each rotating tubular inserted or removed through the center hole, the plurality of laser surface velocimeters comprising a first mounted laser surface velocimeter mounted to the support member at a right angle to the longitudinal axis of a rotating tubular, and a second mounted laser surface velocimeter mounted on the support member at a second angle different from the right angle to transmit a beam to impact the rotating tubular, each of the first laser surface velocimeter and the second laser surface velocimeter to transmit a respective beam to impinge the rotating tubular at an angle from 0.01 degrees to 180 degrees;
a plurality of laser arms connected to and forming a part of the support member, each laser arm connected at an angle to a longitudinal axis of the rotating tubulars as the rotating tubulars are inserted into or removed from the well bore; and
a plurality of laser housings connected to and aligned with a respective one of the plurality of laser arms, each of the laser surface velocimeters being positioned in a respective one of the laser housings.

3. The laser measuring system of claim 2, wherein the plurality of laser surface velocimeters comprises a first mounted laser surface velocimeter and a second mounted laser surface velocimeter, the first mounted laser surface velocimeter attached to the support member at a right angle to a longitudinal axis of a rotating tubular and opposite to and aligned with the second mounted laser surface velocimeter and mounted to the support member at a right angle to the longitudinal axis of the rotating tubular.

4. The laser measuring system of claim 2, wherein the plurality of laser surface velocimeters comprises a first and a second mounted laser surface velocimeter, each of the first mounted laser surface velocimeter and the second laser surface velocimeter mounted to the support member at right angles to a longitudinal axis of a rotating tubular pulled or pushed through the center hole of the support member, and wherein the first and second laser surface velocimeters are mounted to be offset from each other.

5. The laser measuring system of claim 1, further comprising a wiper cover partially covering and circumferentially surrounding the upper pipe wiper, the wiper cover comprising a plurality of mounting holes aligning with bolts of the upper mounting member, the wiper cover configured to retain the upper pipe wiper in place as rotating tubulars are pulled from the center hole.

6. The laser measuring system of claim 5, further comprising a plurality of debris slots formed in the wiper cover to flow debris away from each rotating tubular as the rotating tubular penetrates the center hole.

7. The laser measuring system of claim 1, wherein each laser housing comprises an inlet over which is mounted an inlet plate providing input to the laser housing from an ambient pressure air flow source or pressurized air from a pressurized air source to simultaneously cool each laser surface velocimeter and prevent debris from impacting each laser surface velocimeter maintaining a clean laser lens.

8. The laser measuring system of claim 1, wherein the pressurized gas port increases gas pressure by at least five percent above ambient pressure remove debris and wellbore fluid generated from the wellbore or the at least one rotating tubular.

9. The laser measuring system of claim 2, further comprising an x-ray diffraction device for operation in tandem with at least one of the laser surface velocimeters, the x-ray diffraction device projecting an x-ray beam in tandem and simultaneously with the laser beam at the rotating tubulars inserted into or pulled from the wellbore, the x-ray diffraction device detecting fractures in each rotating tubular while each rotating tubular is being measured by the laser surface velocimeter.

10. The laser measuring system of claim 2, wherein each laser surface velocimeter to detect:
an interference pattern using a frequency meter and a Doppler Effect to compare reflected light from the rotating tubular to emitted light; and
a reference frequency and calculate a velocity for the rotating tubulars run into and out of the wellbore and then calculate length of the rotating tubulars.

11. The laser measuring system of claim 1, further comprising a plurality of rigid debris deflection devices, each rigid debris deflection device covering a respective one of the plurality of laser beam openings in the support member.

12. A laser measuring system for automatic continuous measurement of multiple rotating tubulars connected in series as the rotating tubulars are inserted into or removed from a wellbore, the laser measuring system comprising:
a plurality of laser surface velocimeters oriented to project a laser beam onto the rotating tubulars, the plurality of laser surface velocimeters configured to measure an axial surface speed and a rotating surface speed for each rotating tubular;
a display in electronic communication with the computer processor for presenting measured and computed values for rotating tubulars in real time;
an x-ray diffraction device to detect fractures in each rotating tubular while each rotating tubular is being measured by the laser surface velocimeter;
a computer processor in electronic communication with each laser surface velocimeter;
a data storage in communication with the computer processor, the data storage providing instructions for the computer processor to:
receive and store measurements from each laser surface velocimeter;
calculate from the stored measurements as the rotating tubulars are run into and out of the wellbore:
a length of each rotating tubular;
a total quantity of rotating tubulars; and
a total length of all rotating tubulars; and
instruct the computer processor to store x-ray diffraction information from the x-ray diffraction device and present the x-ray diffraction information on the display in real time;
wherein the calculating includes using a non-linear function to remove the rotation measurements from the velocity measurements for each rotating tubular permitting isolation of rotation or velocity measurements by rotating tubular to provide a total length of each rotating tubular, total depth of all connected rotating tubulars.

13. A method, comprising:
  inserting or removing a plurality of rotating tubulars connected in series into or from a wellbore through a center hole of a support member, the center hole being aligned with a wellbore;
  positioning and orienting a plurality of laser surface velocimeters to each project a respective laser beam onto each rotating tubular as it is inserted or removed through the center hole;
  measuring an axial surface speed and a rotating surface speed for each rotating tubular of the multiple rotating tubulars inserted into or removed from the wellbore through the center hole from reflections of the projected laser beams; and
  calculating a length of the multiple rotating tubulars from the measured axial surface speed and the measured rotating surface speed for each rotating tubular, including:
    a length of each rotating tubular;
    a total quantity of rotating tubulars; and
    a total length of all rotating tubulars;
  displaying the measured and computed values for rotating tubulars in real time;
  projecting an x-ray beam in tandem and simultaneously with the laser beam at the rotating tubulars being inserted into or pulled from the wellbore;
  receiving the x-ray beam return diffracted at least one fracture in on or more of the rotating tubulars; and
  detecting the fracture while the rotating tubular is being measured by the laser surface velocimeters;
  wherein each laser surface velocimeter detects:
    an interference pattern to measure the velocity of the rotating tubular being run into and out of the wellbore using a frequency meter and a Doppler Effect to compare reflected light from the rotating tubular to emitted light; and
    a reference frequency and calculate velocity for the rotating tubular and then calculate length of the rotating tubular.

14. The method of claim 13, wherein the calculating includes using a non-linear function to remove the rotation measurements from the velocity measurements for each rotating tubular enabling isolation of rotation or velocity measurements by rotating tubular to provide a total length of each rotating tubular, total depth of all connected rotating tubulars.

15. The laser measuring system of claim 2, wherein the plurality of laser surface velocimeters comprises a pair of first mounted laser surface velocimeters and a pair of second mounted laser surface velocimeters, wherein each of the second mounted laser surface velocimeters is mounted to impinge the laser beam on the rotating tubular at an angle from 0.01 degrees to 180 degrees from a respective one of the first mounted laser surface velocimeters.

* * * * *